Figure 1:
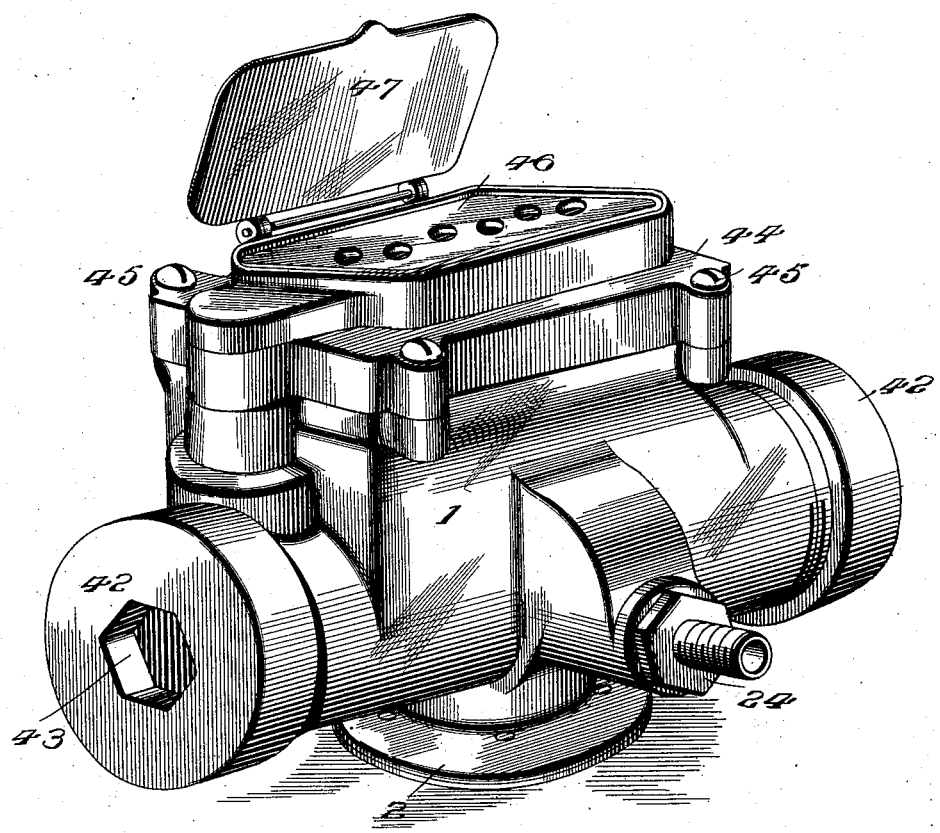

No. 688,378. Patented Dec. 10, 1901.
J. C. ANDERSON.
LIQUID METER.
(Application filed Oct. 18, 1901.)
(No Model.) 5 Sheets—Sheet 1.

No. 688,378.  
J. C. ANDERSON.  
LIQUID METER.  
(Application filed Oct. 18, 1901.)

(No Model.)

Patented Dec. 10, 1901.

5 Sheets—Sheet 3.

Witnesses

Inventor
Jas. C. Anderson
By
Attorney.

No. 688,378. Patented Dec. 10, 1901.
J. C. ANDERSON.
LIQUID METER.
(Application filed Oct. 18, 1901.)

(No Model.) 5 Sheets—Sheet 4.

Witnesses
Inventor
Jas. C. Anderson
By
Attorney

No. 688,378.  
J. C. ANDERSON.  
LIQUID METER.  
(Application filed Oct. 18, 1901.)

Patented Dec. 10, 1901.

(No Model.)

5 Sheets—Sheet 5.

Witnesses  
Inventor  
Jas. C. Anderson  
By  
Attorney

THE NORRIS PETERS CO., PHOTO-LITHO., WASHINGTON, D. C.

UNITED STATES PATENT OFFICE.

JAMES C. ANDERSON, OF HIGHLAND PARK, ILLINOIS.

LIQUID-METER.

SPECIFICATION forming part of Letters Patent No. 688,378, dated December 10, 1901.

Application filed October 18, 1901. Serial No. 79,101. (No model.)

*To all whom it may concern:*

Be it known that I, JAMES C. ANDERSON, a citizen of the United States, residing at Highland Park, in the county of Lake and State of Illinois, have invented certain new and useful Improvements in Liquid-Meters; and I do hereby declare the following to be a full, clear, and exact description of the invention, such as will enable others skilled in the art to which it appertains to make and use the same.

My invention relates to certain new and useful improvements in liquid-meters.

There are several types of meters common and well known in the art, such as piston, rotary, and disk meters. In the rotary and disk type, where the turbine principle is employed, the liquid is measured by its natural trend and pressure, and great friction results in the contact of the peripheries of the disks with the casing, and the trend and pressure of the fluid induce to the formation of eddies and the consequent deposit of the sediment contained in the fluid, which operates to retard and finally stop the action of the meter. In the piston type of meters the liquid is measured by actual displacement, and it has been found necessary to employ more than one piston or plunger in order to overcome dead-centers, and that the multiplicity of pistons involves comparatively extensive friction, complexity of construction, and necessarily undue cost of manufacture. It has also been found by practical experience that in the use of both types hereinbefore referred to when from any cause the meter is stopped and fails to register the liquid may readily pass through and be delivered from the meter without any record thereof being made, and as a further result of this imperfection in construction and operation, even when the register is operating, a greater or less amount of fluid may leak through the meter and conduits without being accurately registered, and hence where such meters are used to compute the supply of water to consumers it follows that more water may be used at all times than will be registered, and, as before stated, a comparatively full supply may be used when the meter ceases altogether to register the passage of the water therethrough.

My invention relates more particularly to that type known as "piston" or "plunger" meters, and has for its object to overcome all of the recited disadvantages and to provide a meter which shall accurately register all liquid passing through the same, which shall be self-cleansing, its bearings kept in perfect adjustment at all times, and provided with means for absolutely and automatically cutting off the supply of liquid whenever the meter fails to accurately record the passage of fluid.

It also has for its object economy of construction, durability in use, and the utilization of the full projectile force of the fluid to be measured by it.

With these ends in view my invention consists of a single-piston meter in which the piston has a reciprocating and oscillating movement and coöperates with a recording mechanism to accurately register all fluid displaced by the movement of the piston and means coöperating with the piston for automatically shutting off the supply of fluid through the meter whenever for any reason the meter fails to register the supply furnished to it.

My invention consists, further, in the details of construction and arrangement for accomplishing the objects sought.

In order that those skilled in the art to which my invention appertains may know how to make the same and fully understand its operation, I will proceed to describe the same in detail, referring by numerals to the accompanying drawings, in which—

Figure 2:
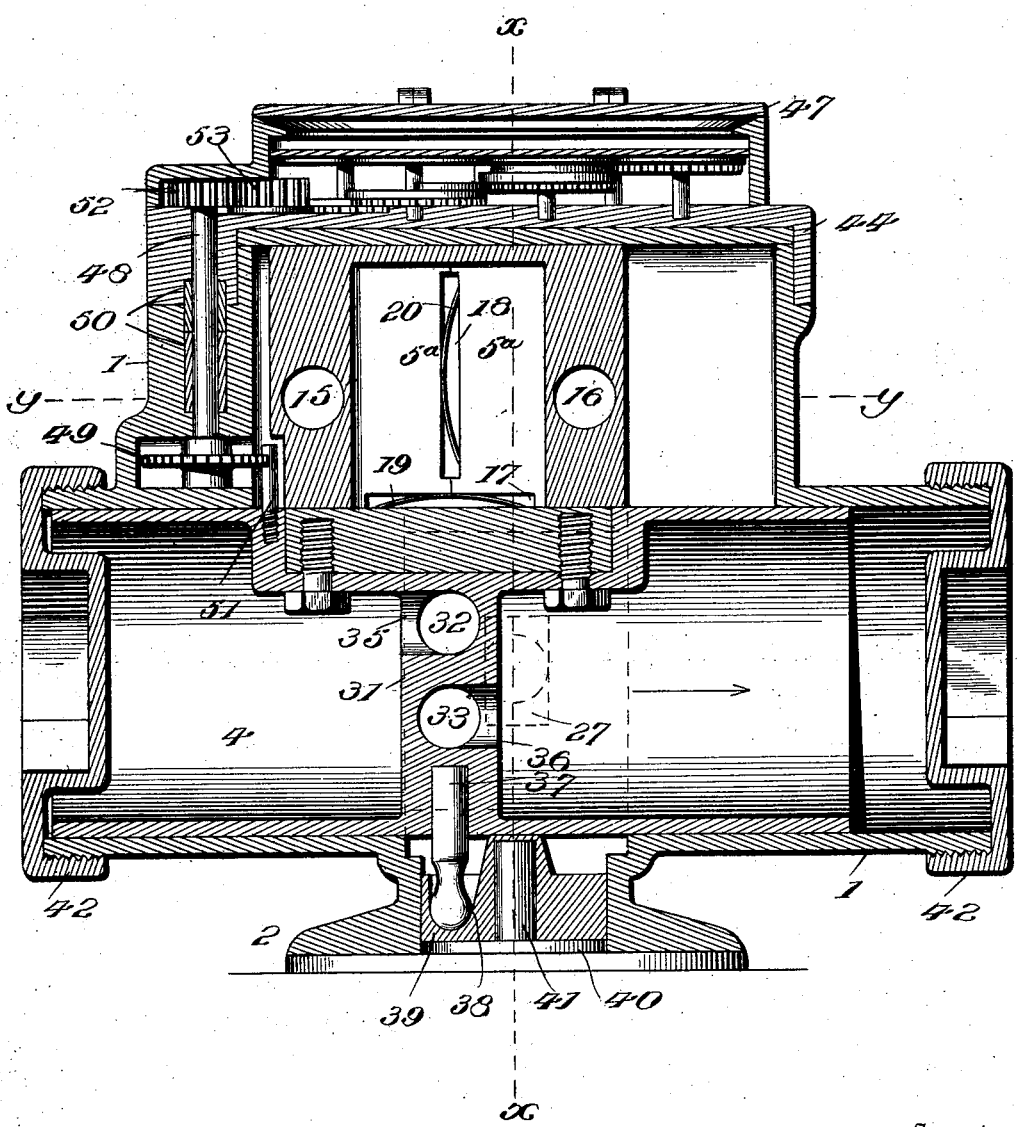
Figure 3:
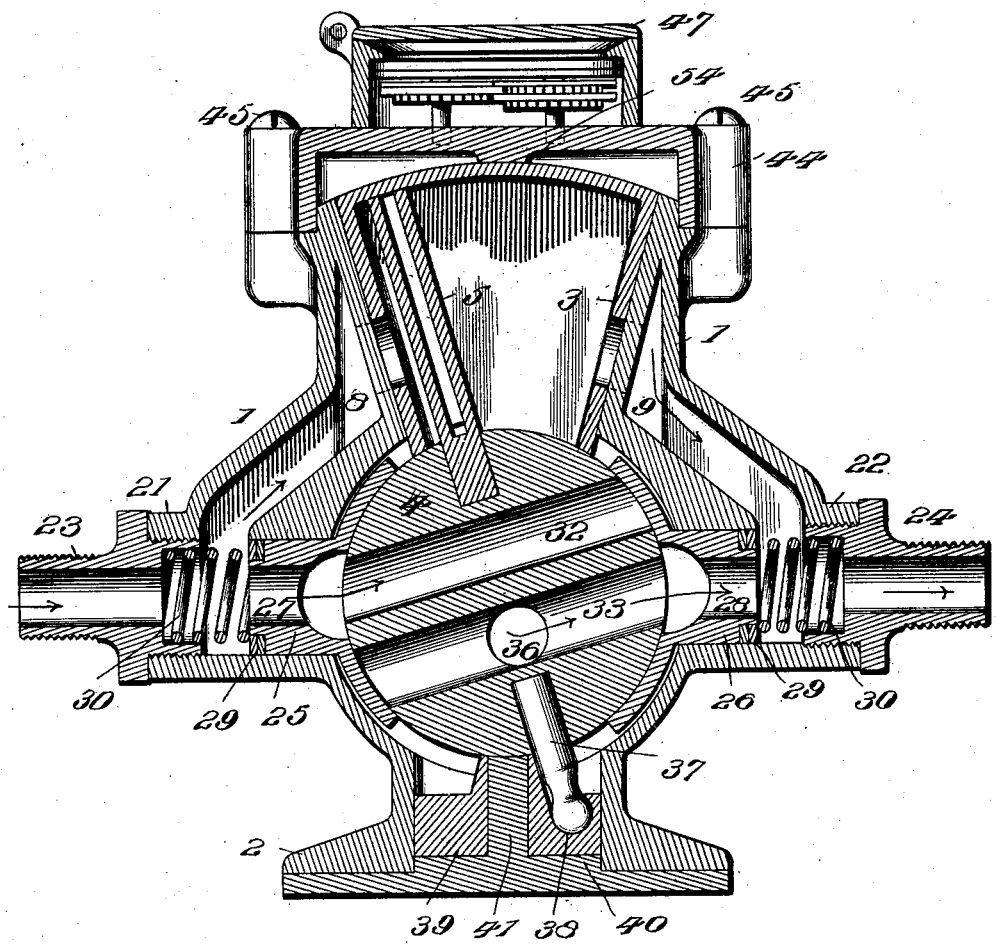

Figure 1 is a perspective view of my improved meter and of full size for connection with three-eighths-inch inlet and exit connections. Fig. 2 is a central longitudinal section on the line $zz$ of Fig. 4. Fig. 3 is a transverse section on the line $xx$ of Fig. 2, showing the parts in a different position; and Figs. 4, 5, 6, and 7 are horizontal sections taken on the line $yy$ of Fig. 2 and showing the various positions and relations of the box-valve and piston-wing during the reciprocating and oscillating movements of the piston.

Figure 4:
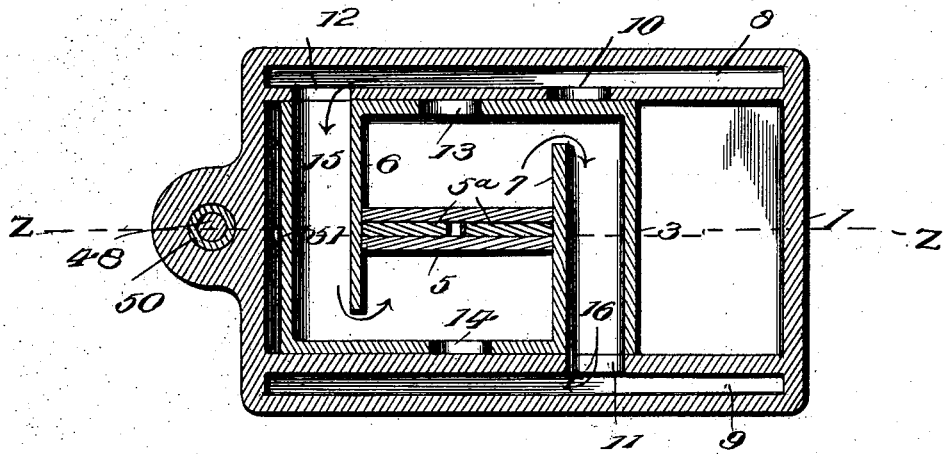

In Fig. 2 the piston is shown in the position occupied when ready to start, and in this position the box-valve, piston-wing, and position of the several ports are shown in Fig. 4, one of the automatic cut-off devices being shown in dotted lines and in position to begin to permit the passage of the fluid, the cut-off on the opposite side bearing the same relation to the other diametric exhaust-port of the piston.

Figure 5:
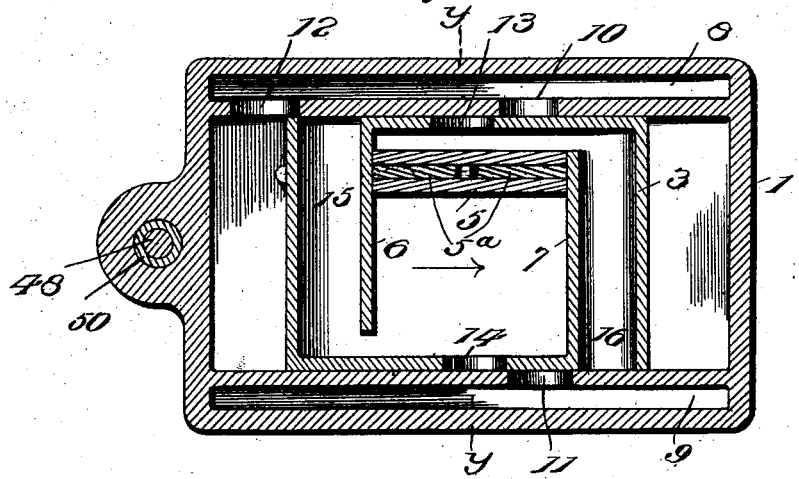

Fig. 3 shows the position of the piston and its diametric ports in relative position with the automatic cut-offs when the box-valve has assumed the position shown in Fig. 5 and after the piston has moved a half-stroke to produce a one-fourth revolution.

Fig. 4 shows the position of the box-valve at a state of rest just before it begins its movement under the liquid-pressure and just as the piston begins the first quarter of its reciprocating movement, the initial inlet and outlet ports of the box-valve and its casing being in full register, so that the force of the fluid may be exerted against the piston-wing to oscillate the piston, the diametric ports of which at this time are closed, as shown at Fig. 3.

Fig. 5 shows the position of the box-valve and wing after the piston has traveled one-half of its longitudinal movement to the right, or in direction indicated by the arrow in Fig. 2, in which position the second set of ports of the box-valve are ready to begin to register with corresponding ports in the box-valve case as the piston moves through the second half of its travel to the right, and the ports in the box-valve and case permit the fluid-pressure to be exerted on the reverse side of the wing to throw the same toward the opposite side of the box-valve, and thus oscillate the piston.

Figure 6:
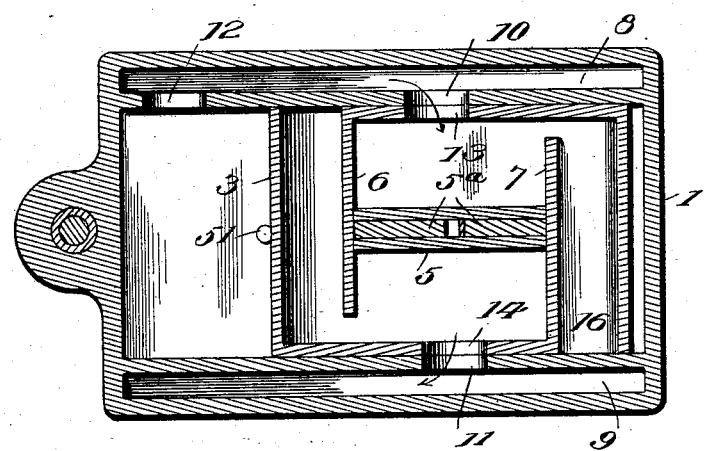

Fig. 6 shows the position of the box-valve and wing when the piston has completed its travel to the right and has made a full half-stroke, and at which time the second set of ports of the box-valve and casing are in full register and the diametric ports of the piston are closed by the cut-off devices, at which time the fluid-pressure against the piston-wing oscillates the piston and begins to bring its diametric ports in register with ports in the cut-off devices to admit the fluid at the right of the piston, causing the same to begin its reverse half-stroke.

Figure 7:
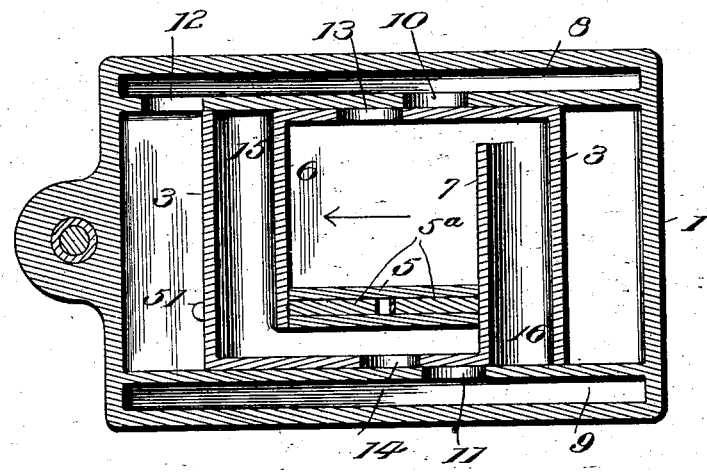

Fig. 7 shows the position of the ports when the piston has traveled one-half of its reverse movement to the left, at which time the second set of ports in the box-valve and its case have traveled out of register and remain closed until the piston has completed its reverse movement and the position of the several ports shown at Fig. 4 are again resumed.

Having explained in detail the relation of the several parts of the meter as illustrated in the several figures of the drawings, I will now describe their construction and operation.

1 is the case, formed with a suitable base 2. The upper portion of the case 1 is open, as clearly shown at Fig. 3, and its interior side walls are inclined to constitute a seat for what I denominate a "box-valve" 3, whose side walls are correspondingly inclined, as shown, and which, together with the two straight end walls, are cast integral with an arc-shaped top. The inclined side walls of this box-valve project slightly below the incline side walls of the case and rest upon the cylindrical upper surface of the piston 4, located within the correspondingly-shaped portion of the case 1. The piston is provided on its upper surface with a radial wing 5, adapted to fit between the two partitions 6 7, intermediate of the end walls of the box-valve 3, (see Figs. 4, 5, 6, and 7,) and is constructed, as will be presently explained, so as to hold it in frictional contact with the partitions 6 and 7 and end walls of the box-valve 3.

The casing 1 above the inlet and exit connections is cast hollow, as shown, to constitute passages 8 9, leading to ports 10, 11, and 12 in the inclined side walls of the upper part of the case and which register, as will be hereinafter described, with ports 13, 14, 15, and 16 in the sides of the box-valve as the latter is reciprocated by the piston 4 through the medium of the wing 5. The wing 5, as shown in the several figures, is formed with a central kerf, in which are located two metallic packing-plates $5^a$, provided with recesses 17 and 18, in which are located flat springs 19 and 20, designed to hold the said plates in close contact with the partitions 6 and 7 and the curved top of the box-valve 3 to pack the same against leakage in an obvious manner.

Centrally of the longitudinal length of the casing it is extended laterally, as shown at 21 22, to constitute seats for the inlet and outlet screw-nipples 23 24 and for two cut-off devices 25 26, formed with axial channels or ports 27 28, and suitable packing-rings 29 are employed to make a water-tight joint between the cut-offs and case 1. The inner portion of these cut-offs is arc-shaped in cross-section, as shown at Fig. 3, to contact with the cylindrical body of the piston 4 and extend a predetermined distance (longitudinally) each side of the axial channels or ports 27 28, as indicated in dotted lines at Fig. 2, the interior rectangular dotted lines indicating the axial port of one of the cut-offs; but such ports may be of any other suitable design in cross-section. The nipple connections 23 and 24 are counterbored at the inner end to form shoulders, between which and the packing-rings 29 are located spiral springs 30 for assisting in holding the inner arc surfaces of the cut-offs always in close contact with the cylindrical surface of the piston, the area of the outer ends of the cut-offs being such that the fluid-pressure against the same acts auxiliary to the springs 30 in producing the close contact referred to. From this construction and arrangement it will be seen that the wear between the contact-surfaces of the cut-offs and the piston is always compensated for and normal and proper relation is continuously maintained.

The piston 4 is hollow, as shown at Fig. 2, with a central partition 31, through which are two diametric parallel channels or ports 32 33, the port 32 communicating centrally with a longitudinal port 35, opening into the right-hand end of the piston, and the port 33 communicating with a similar longitudinal port 36, opening into the opposite end of the piston. The piston 4 is provided with a central radial wrist-pin 37, with a spherical extremity adapted to be seated within a cylindrical recess 38 near the periphery of a disk or ring 39, rotatively seated in the base 2, as clearly shown at Figs. 2 and 3. This disk or ring 39 is maintained in axial relation with the base through the medium of a washer 40, having a central stem 41 and held in position by a cap-plate 42, as shown at Fig. 2, or the cap-plate and washer may be made integral, as shown at Fig. 3.

The cylindrical body of the case 3 is closed at each end by screw caps or heads 42, which are preferably formed with a multisided recess 43, adapted to receive a suitable wrench used for securing the heads in place or removing them when necessary. The upper rectangular portion of the case 2, which receives and holds the box-valve, is closed by a cover 44, secured in position by screws 45. Within the upper part of this cover are arranged the registering disks or wheels, which are inclosed by a glass plate 46, protected by a hinged cover 47.

In one end of the case 2 is mounted a vertical shaft 48, keyed near its lower end, with a spur-wheel 49 within a suitable recess within the case. The upper end of the shaft 48 has a bearing within the solid portion of the cover 44, and suitable packing 50 is arranged around the shaft, as clearly shown at Fig. 2. A radial stud 51 projects from the periphery of the piston near one end and bears such relation to the spur-wheel 49 and the stroke of the piston 4 that when the latter has completed a stroke the stud 51 will be seated between two adjacent spurs of the wheel 49, and as the first movement of the piston in repeating its strokes is an oscillation on its axis produced by the movement of the wing 5 within the box-valve 3 the movement of the stud 51 will be sufficient to rotate the wheel 49 and its shaft 48 a predetermined distance.

To the upper end of the shaft 48 is keyed a gear 52, which meshes with the primary gear 53 of the train of registering gears located within the cover 44.

The under side of the cover 44 is provided, preferably, with a rib 54, which acts auxiliary to the liquid-pressure to hold the box-valve 3 to its bearings upon the upper face of the piston 4.

Having described the construction and arrangement of the several parts of my improved meter, I will now describe its operation. Assuming that the piston is in the position shown at Fig. 2 and that the nipple 23 is connected with the supply-pipe and the flow of liquid is turned on, the diametric port 32 of the piston has its inlet and exit ends closed by the cut-offs 25 and 26, and likewise the inlet and outlet of the diametric port 33 is closed by said cut-offs, and in this position the port 32 is just ready to be moved into register with the inlet connection, which is done by the oscillation of the piston through the vibration of the wing 5 under the pressure of the fluid against the same. The liquid under pressure passes into the port 32 of the piston, and as the exit end of this port is closed by the cut-off 26 the liquid travels from the port 32 into and through the longitudinal port 35 and between the central partition 31 of the piston and the head 42 of the case or cylinder 1, and consequently the piston is caused to continue on the first half of its stroke in the direction of the arrow shown at Fig. 2. A portion of the supply of liquid also flows upward through the space 8 of the upper portion of the case 1, through the port 12 in the side wall, thence through the port 15 of the box-valve 3, and against the radial wing 5 of the piston, thus vibrating the wing toward the back wall of the box-valve, as indicated by the arrows at Fig. 4, and consequently the piston is oscillated upon its longitudinal axis a distance proportionate to the travel of the wing—that is, when the piston has moved longitudinally a distance equal to one-quarter of its full stroke the wing-valve has completed one-half of its vibration, and the fluid contained in the box in rear of the wing 5 is forced in the direction of the arrows through the ports 16 and 11 to the space 9, and to the exit through the nipple 24 and to its connection. (See Figs. 3 and 4.) The box-valve 3 being moved during this action longitudinally by the longitudinal travel of the wing 5 with the piston in the direction shown by arrow at Fig. 5 the port 15 is closed, as shown at Fig. 5, and the fluid may then pass from port 12 through the space between the end wall of the box-valve and the end wall of the case and over the arc-shaped top of the box-valve and each side of the longitudinal rib 54 to exert vertical pressure upon the top of the box-valve to hold it to its seat. As the piston and valve-box continue their longitudinal movement, the port 10 in the side wall of the case begins to register with the port 13 in the side wall of the box-valve, the area of registration gradually increasing and reaching full register on completion of the half-stroke of the piston. During this movement the liquid under pressure in the space 8 of the case 1 passes through the ports 10 and 13 and exerting its pressure against the wing 5 vibrates it to the position shown at Fig. 6, and the liquid contained in the box of the valve in front of the wing is forced through the ports 14 and 11 to the space 9 of the case, and thence through the exit-nipple 24. At the same time that the ports 10 and 13 are beginning and completing register to admit the liquid against the rear side of the wing, as just described, the vibration of said wing has caused the piston to oscillate, so as to correspondingly bring into register the opening or port 27 of the cut-off 25 with the inlet end of the diametric port 33 of the piston, and to correspondingly bring the outlet of port 33 against the arc-shaped face of the cut-off 26, so that no liquid can pass through said port to the opening or port 28 in the said cut-off, but must travel from the diametric port 33 to its intersecting longitudinal port 36 and against the opposite end of the casing 1 to force the piston in a reverse reciprocating direction to that already described and to make the last half of its stroke. During these movements the inlet end of diametric port 32 is closed by the cut-off 25, and the exit end of said port is registered with the opening or port 28 of the cut-off 26, and the liquid between the piston and the head 42 of the case is forced through the longitudinal port 36 and diametric port 33 to the port 28 and through the nipple connection 24. When the piston again starts in the direction first described, the liquid contained in the case is forced through the longitudinal port 35 to the diametric port 32, the exit of which being in register with the opening or port 28 of the cut-off 26 the fluid is free to pass through the nipple connection 24. From this description it will be seen that as the piston is reciprocated in opposite directions the fluid alternately used at each end to cause such reciprocation of the piston is displaced and forced alternately through the diametric ports 32 and 33 to the delivery connection 24. The connection between the wrist-pin 37 on the piston and the disk or ring 39 steadies and makes uniform the reciprocating and oscillating movement of the piston, and to avoid the necessity for the use of buffers and the "card" made by the spherical end of the wrist-pin is a true circle. Hence the disk or ring 39 is revolved around its axis 41. The oscillation of the piston upon its longitudinal axis, which is caused by the vibration of the wing 5, and in view of the connection of the wrist-pin with the disk-pin 39 causes the piston to also move longitudinally a sufficient distance to roll the diametric ports of the piston into and out of register with the inlet and outlet connections and to permit the completion of such registration as the piston is reciprocated under the action of the fluid thus admitted between the central partition of the piston and the heads, respectively, of the casing.

By special reference to Fig. 3 and in view of what has been said it will be apparent that every moving part is under constant pressure, and therefore that all joints and connections are kept water-tight, that all wear is compensated for, and the proper relations of the several movable parts is always maintained. It will also be observed that when for any reason the meter fails to operate as designed for registering the passage of liquid through the same the passage of any fluid through the meter at such time is positively and absolutely cut off and attention is thereby directed to the necessity of restoring it to operative condition.

The several parts are economic of construction, interchangeable, and readily assembled.

Many changes may be made in the mere details of construction and in the proportions or scale of the meter without departing from the genus of my invention. For instance, while I have shown and described the parallel ports as passing diametrically through the piston in order to alternately register with the inlet and outlet ports of the casing the ports passing through the piston may trend in any other direction, according to the location of the inlet and outlet ports of the casing.

Having described the construction and operation of my improved meter, what I claim as new, and desire to secure by Letters Patent, is—

1. A liquid-meter consisting of a case provided with inlet and exit connections, a single reciprocating and oscillating piston having diametric ports communicating with transverse ports leading in opposite directions, means operated by the pressure of the liquid for oscillating the piston, and means intermediate of the casing and piston for automatically closing the diametric ports of the piston when the same is at rest, substantially as hereinbefore set forth.

2. In a liquid-meter such as described a casing having an upwardly-extended portion with interior inclined side walls with fluid passages or channels exterior thereto communicating with inlet and exit connections and having ports through the inclined side walls, a piston located within the cylindrical portion of the casing and with diametric and longitudinal ports therein, a radial wing connected with the periphery of the piston, an open-bottom valve-box inclosing the radial wing of the piston and seated against the inclined side walls of the case and upon the circular body of the piston, and having ports adapted to alternately register with the ports in the inclined walls of the casing, and arc-faced cut-offs arranged between the periphery of the piston and the casing and adapted to automatically cut off the liquid-supply to the diametric ports of the piston, substantially as and for the purpose set forth.

3. In a liquid-meter such as described, in combination with the casing and a piston located therein and adapted to reciprocating and oscillating movements, a rotary shaft located in the casing and provided with a spur wheel or gear at its lower end and with a gear at its upper end adapted to coöperate with registering mechanism, and a radial stud secured to the periphery of the piston and adapted to contact with and rotate the spur wheel on the rotary shaft referred to, substantially as and for the purposes set forth.

4. In a liquid-meter such as described, in combination with the case having inlet and exit passages and a reciprocating and oscillating piston located between the inlet and outlet passages of the case, and provided with diametric ports, cut-offs seated within the inlet and outlet passages and provided with central passages or ports, and an arc-shaped flange adapted to register with or close the transverse ports of the piston, substantially as and for the purposes set forth.

5. In combination with the casing constructed as described and a reciprocating and oscillating piston provided with a radial wing, an open-bottom valve-box formed with partitions adjacent to each end, trending in opposite directions to constitute passage-ways and ports 15 and 16, and provided with oppositely-disposed ports 13 and 14, substantially as and for the purpose set forth.

6. In combination with the casing having inlet and outlet connections and vertical liquid-passages on either side, and a port near one end communicating with the interior of the casing, a reciprocating box-valve having a closed top and located within the casing, said box-valve being shorter than its seat in the casing, whereby the fluid may pass under pressure from the vertical passage of the casing over the top of the box-valve to hold the same down to its seat, substantially as hereinbefore set forth.

7. In combination with the casing provided with inlet and outlet connections and a piston located within the casing and provided with ports adapted to register with the inlet and outlet passages of the casing, cut-offs located between the casing and the piston and at the inlet and outlet passages, and adapted to automatically open and close the inlet and outlet passages of the casing and to prevent leakage substantially as hereinbefore set forth.

8. In combination with the case provided with inlet and outlet connections and the oscillating and reciprocating piston, cut-offs located between the piston and casing and seated in the casing, and provided with an arc-shaped flange surrounding a central opening or port on the inner end, and an annular bearing-surface at the outer end upon which liquid-pressure may be exerted, substantially as and for the purpose set forth.

9. In combination with the casing constructed as described, and the reciprocating and oscillating piston and cut-offs, nipple connections 23 and 24, counterbored on the inner end, and pressure-springs 30, substantially as and for the purpose set forth.

10. In combination with the casing, piston and box-valve, the radial wing 5, seated in the body of the piston and formed with central kerf, and packing-plates $5^a$ and springs 19 and 20, substantially as and for the purpose set forth.

11. In combination with the casing and reciprocating and oscillating piston, a radial wrist-pin 37 secured to the piston and having its outer end located in a seat within a rotative disk or ring whereby the movements of the piston are steadied and the necessity for buffers is avoided, substantially as described.

12. In combination with the casing and the reciprocating and oscillating piston, provided with the radial wrist-pin 37, the disk or ring 39, the washer 40, with stem 41, and means for securing the same in position, substantially as and for the purpose set forth.

In testimony whereof I affix my signature in presence of two witnesses.

JAMES C. ANDERSON.

Witnesses:
D. G. STUART,
JNO. J. HARROWER.